July 3, 1956  W. E. DION  2,753,499

INTERLOCK FOR MANUAL-AUTOMATIC CONTROL SYSTEMS

Filed July 2, 1953

INVENTOR.
Warren E. Dion
BY
E. C. Sanborn
Attorney

United States Patent Office 2,753,499
Patented July 3, 1956

2,753,499

INTERLOCK FOR MANUAL-AUTOMATIC CONTROL SYSTEMS

Warren E. Dion, Bristol, Conn., assignor to The Bristol Company, Waterbury, Conn., a corporation of Connecticut Application July 2, 1953, Serial No. 365,745

13 Claims. (Cl. 318—29)

This invention relates to electrical control systems, and more especially to servo-actuated systems having an auxiliary manual control which may be superposed thereon at will. In remote positioning systems, for example those used in the navigation and control of aircraft, it is customary to provide electrical means whereby the position of a movable member such as a throttle valve or a control surface may be established by similarly positioning a manually movable lever or its equivalent. This function is usually accomplished by means of some form of servo- or follow-up system, whereby the controlled member continually tends to follow such displacements as may be imparted to the lever. Such systems are frequently provided with fail-safe means whereby upon failure of any of the electrical components of the servo or of the interconnecting circuits, the apparatus will come to rest and will be rendered immovable in so far as the follow-up system is concerned. An example of a control system embodying the foregoing characteristics is found in my copending application Serial No. 232,739 filed June 21, 1951, now Patent No. 2,710,933.

In installations of this nature it is generally desirable that the follow-up system be supplemented by a direct manual control, immediately available to the operator or pilot, and in which the servo mechanism and its components are by-passed and the controlled member rendered directly responsive to electrical switching means. Systems having this feature are generally known as "manual/automatic" controls. In effecting the objective of such controls it is customary to include in the electric circuit a three-position switch, of which two positions will apply power directly to the motor in its respective operating directions, and wherein the third renders the system fully automatic in its response to the manually actuated positioning lever.

In the practical application of automatic positioning systems having superposed manual control there enters one condition which, unless met by suitable precautions, may be productive of undesirable, and even dangerous, results. This condition is found in the restoration from manual to automatic control at a time when the position of the controlled motor differs materially from the setting of the positioning lever and its associated electrical components. There are various circumstances under which this may occur, and the results, while not wholly predictable, and greatly subject to the nature of the installation as well as to the relative position of the control and positioning members at the time of switching, are likely to be most objectionable, if not actually hazardous.

It is an object of the present invention to provide in a manual-automatic control system of the class described such means as will render the system inoperative and prevent any action of the control motor if the positions of the controlled member and the primary positioning member are not in substantial correspondence when, after manual operation, or after an interruption, power is restored to the automatic control apparatus.

In carrying out the purposes of the invention, it is proposed to provide in the circuits of a control system having manual/automatic features as hereinbefore described, a combination of relays so interlocked in their operation that unless the balanceable electrical network upon which the positioning system is based is in a balanced condition, as indicated by both its motor-acutating relays being open, at the time of transferring the control from manual to automatic or otherwise energizing the automatic control, the motor operating circuit cannot be completed and hence the motor will not be operated. The relay combination is further characterized by the property that upon the primary positioning lever being brought into a position corresponding to that occupied by the control mechanism, with a consequent balancing of the positioning network and simultaneous release of both motor-actuating relays, the system will at once revert to normal remote control, and will remain so until the apparatus is again manually operated, or is subjected to a power interruption.

Figure 1:
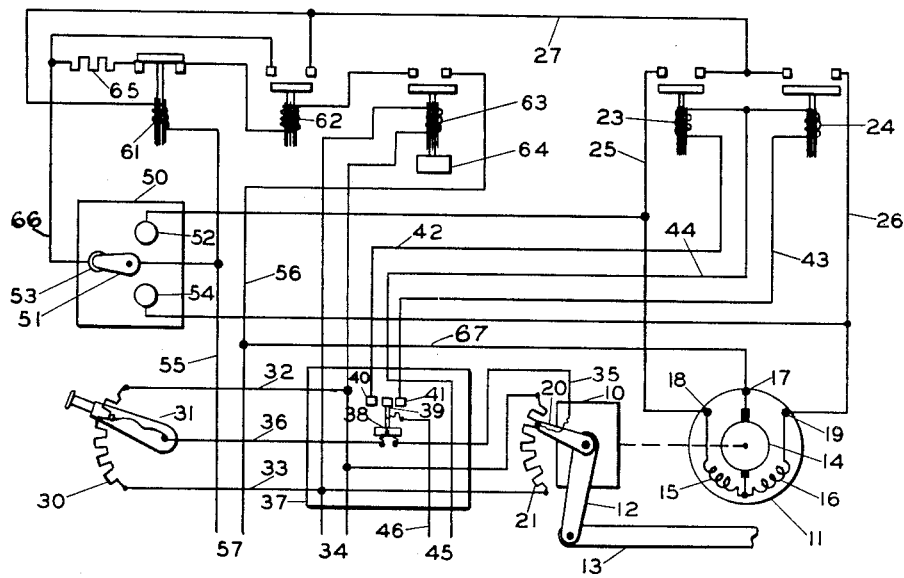
Fig. 1 is a diagrammatic representation of an electrically actuated manual/automatic control system embodying the principles of the invention.

In the Fig. 1 of the drawings, the numeral 10 designates a positioning mechanism to be operated in accordance with the principles of the invention, and adapted to be driven by a mechanically connected reversible electric motor 11, whereby to vary the angular position of a lever-arm 12, attached by suitable means, such as a reach-rod 13, to an element (not shown) whose position it is desired to control. While for the purposes of the invention the motor 11 may be of any type adapted to reversible operation through the intermediary of suitable electric relays, it is here shown as of the "divided field" class, having a single armature 14 and two field windings 15 and 16 in opposed relationship, with a common terminal to which is connected one terminal of the armature. The motor thus has three external terminals, designated as 17, 18 and 19 corresponding respectively to the free terminal of the armature and to the free terminals of the individual field windings.

According to well known principles, the motor 11 will operate as a series-connected motor when the terminal 17 and either the terminal 18 or the terminal 19 are connected to a suitable source of power supply; and the direction of rotation of the armature 14 will depend upon which of the two latter terminals is included in the circuit. Mounted upon the output shaft of the positioning mechanism 10, and attached to the arm 12 for angular displacement therewith, is a rheostat arm 20 having a contact member translatable along a voltage-dividing resistor 21 whereby to apportion the two sections into which it divides said resistor according to the deflected position of said arm.

For purposes of automatic, or servo-, actuation of the motor 11, there are provided two contactors 23 and 24, each having a set of contacts normally open and adapted to be closed upon energization of the corresponding actuating winding. (For the purpose of clarity, these devices, recognized in the prior art, are herein expressly referred to as "contactors," whereby to be distinguished from relays, presently to be described, and to whose interconnection and functions the invention is especially directed.) One of the contacts of contactor 23 is connected by means of a conductor 25 to the terminal 18, and one terminal of the contacts of contactor 24 by means of a conductor 26 to the terminal 19, of the motor 11. The free terminals of the contacts are interconnected by means of a conductor 27.

For normal modulated, or "follow-up" control of the positioning motor 11, there is provided an adjustable voltage-dividing resistor 30, comprising a slide-wire element and a contact arm 31 manually adjustable therealong whereby, as with the resistor 21, to apportion the two sections into which it divides the resistor. The extremities of the respective voltage dividers 21 and 30 are interconnected, each to each, by means of two conductors 32 and 33, which are connected also to the respective sides of an electric energy source 34. To the contact member carried by the rheostat arm 20 is connected a conductor 35, and to the contact arm 31 is connected a conductor 36, the combination of voltage dividers and interconnections thus constituting a bridge network which, when energized from the source 34, will be characterized by a potential difference between said last-named conductors representative in sense and in magnitude of such unbalance as may exist due to asymmetrical relative positioning of the arms 20 and 31. Between the conductors 35 and 36 is placed a detector-amplifier device 37 responsive to said unbalance conditions. While the device 37 is preferably of the form fully set forth and described in my aforementioned copending application Serial No. 232,739, and having certain stabilizing and fail-safe features, the present invention is not in any sense limited to use in combination with such a device; and, in the interest of simplicity, the detector-amplifier 37 is shown as a simple contact-making galvanometer.

The galvanometer in the device 37 comprises an angularly deflectable coil 38 to the terminals of which are connected the conductors 35 and 36 respectively, and adapted to be deflected in a direction depending upon the sense of the potential existing between said conductors due to unbalance of the bridge network. Structurally attached to the coil 38 and deflectable therewith is an electrical contact member 39 adapted for limited displacement between two stationary contacts 40 and 41, to engage one or other of the same when deflected, and to assume a neutral position therebetween when the bridge network is in a balanced condition.

Operative connection between the detector-amplifier device 37 and the contactors 23 and 24 is provided by a conductor 42 connecting contact 40 to one terminal of the actuating winding of contactor 23, a conductor 43 connecting contact 41 to a terminal of the winding of contactor 24, a conductor 44 connecting both free terminals of said windings to one side of an electric power source 45, and a conductor 46 connecting the movable galvanometer contact 39 to the other side of said source.

Direct manual control, alternative to the modulated control comprising the balanceable bridge network, is provided by a three-position switch 50 having a manually operable contact arm 51 which may at will be placed in engagement with any one of three contacts 52, 53 and 54, or in an intermediate open-circuit position, corresponding to a non-operative condition of the apparatus controlled thereby. (A switch suited to this purpose is exemplified in U. S. Letters Patent No. 1,666,338, granted to G. J. Mauer, April 17, 1928.) Contacts 52 and 54 are respectively connected to the conductors 25 and 26, and thereby to the terminals 18 and 19 of the motor 11. To the arm 51 is connected a conductor 55, which, with a companion conductor 56 provides connection to an electrical supply source 57. Connections to the contact 53 will presently be set forth.

The interlocking feature, to which the present invention is especially directed, comprises two relays 61 and 62, the former being of the normally-closed circuit-opening type, and the latter of the normally-open circuit-closing type, together with a third relay 63 provided with an actuating winding permanently connected to the source 34, and with a set of contacts adapted to be closed when said winding is energized and open when it is de-energized. The relay 63 is also equipped with a timing element 64, which, while permitting the relay contacts to open immediately upon de-energization of the winding, will introduce an appreciable time delay in the reclosing of said contacts when the winding is energized after an interruption. Such a relay is exemplified in Type PWAA1, commercially supplied by Struthers-Dunn, Inc., of Philadelphia, and described in that company's Catalog "H" (copyright 1952).

The actuating windings of the relays 61 and 62 are rated for operation from the source 57; and, as will be well understood by those versed in the art of electrical control, their impedances will be of a high order of magnitude (probably at least 50/1 compared with the impedance of the motor 11, or of any motor or corresponding control device with which they might be associated on a common power source in this class of control). One terminal of the winding of relay 61 is connected to the conductor 27 (common to the contacts of contactors 23 and 24), and the other terminal of said winding is connected to the line conductor 55. One terminal of the actuating winding of relay 62 is connected to one contact of relay 61, and the other terminal of said winding in series with the contacts of relay 63 to the line conductor 56. The free contact of relay 61 is connected in series with a resistor 65 to a conductor 66, and thence to the terminal 53 of the three-position switch 50. The contacts of the relay 62 are connected respectively to the conductors 27 and 66.

It will be observed that the electrical circuits have been described as adapted to energization from three distinct sources, 34, 45 and 57. In so far as the present invention is concerned, these may be alternating-current, or direct current, or may differ in this respect, as they may, and probably will, in the matter of voltage. On the other hand, it may be practicable and expedient to energize any two, or all three, of the circuits from a common source.

Consideration may first be given to operation of the control system under modulated, or servo-, action, wherein the mechanism is desired to follow the setting of the primary control arm 31 and to come to rest in a position corresponding to that so established. For such operation, the three-position switch 50 will be set with the contact arm 51 on the contact 53. If the relay 61 be not energized, its contacts will be closed, and, with the relay 63 energized from the source 34, its contacts also will be closed. Thus, a current path will be provided from the conductor 55, comprising one side of the source 57, through said relay contacts, the switch 50, the resistor 65 and the actuating winding of relay 62 to the conductor 56 constituting the other side of said source, thereby energizing said last-named relay and closing its contacts. There will thus be provided a direct connection between conductors 55 and 27; and, since the terminals of the winding of relay 61 are connected to these conductors respectively, they will be at a common potential, and the relay 61 will remain de-energized, with its contacts closed.

Interconnection of conductors 55 and 27, the latter being common to the contacts of contactors 23 and 24, also provides a circuit whereby upon closing either set of said contacts one or other of the field windings in the motor 11 will be energized, in series with the armature 14, and the latter caused to rotate in a corresponding direction. The terminal 17 of said armature is connected to conductor 56 of the source 57 by a conductor 67.

If the two contact arms 20 and 31 occupy corresponding positions, wherein there is established a condition of electrical balance in the bridge comprising the voltage-dividing resistors 21 and 30, no potential will exist between the conductors 35 and 36, and the galvanometer will assume its neutral position wherein the movable contact 39 lies intermediate the contacts 40 and 41, with the result that both contactors 23 and 24 will remain de-energized, with their contacts open, and the motor 11 and mechanism actuated thereby will be at rest.

Upon displacement of the contact-arm 31, and a resultant disturbance of balance in the network of which the resistor 30 forms a part, a "signal voltage" or potential will appear between the conductors 35—36, causing the coil 38 of the galvanometer to be angularly deflected in a sense depending upon that of the unbalance, and the movable contact 39 to engage one or other of the stationary contacts 40—41, energizing the corresponding one of the contactors 23—24 from the source 45, and effecting operation of the motor 11 in a predetermined direction. Electrical polarities and mechanical connections being suitably selected and coordinated, the resulting operation of the mechanism 10 will be such as to move the contact-arm 20 along the resistor 21 in a sense to reestablish balance in the electrical network; and, upon the balancing action being completed, the galvanometer will open its closed contact, de-energizing the corresponding contactor, and bringing the motor and the mechanism to rest in a position corresponding to that established by the arm 31. The lever-arm 12 and the actuating bar or reach-rod 13 attached thereto will thus be moved to a desired predetermined position.

The action as thus far described is in every sense equivalent to the normal performance set forth for the apparatus disclosed in my application Serial No. 232,739, now Pat. No. 2,710,933; and it will be understood that the electronic control there shown, together with the several refinements to which said application is specifically directed, may be substituted for the simplified control apparatus comprised in the device 37 without in any way departing from the spirit of the present invention.

In examining the action of the apparatus when under "manual" control by direct manipulation of the switch 50, it may first be assumed that such control is initiated with the follow-up control in a neutral condition, when the bridge network will be in a state of electrical balance, and both the contactors 23 and 24 will stand with their windings de-energized and their contacts open. As the contact arm 51 is moved from the contact point 53, the relay 62 will become de-energized and will open its contacts, the contacts of the relay 61 remaining, as heretofore, closed. If the switch arm 51 be now brought into engagement with the contact point 52, connection will be provided from the line conductor 55 to the conductor 25 and directly through the motor field winding 15, in series with the armature 14, to the conductor 56, causing the motor 11 to operate in a corresponding direction, and to continue so to operate as long as the switch arm 51 remains in engagement with the contact member 52. Similarly, if the switch arm 51 is brought into engagement with the contact member 54, the motor will be energized through the conductor 26, effecting rotation in the opposite direction. (It will be understood that limit switches, not shown in the drawing, will normally be provided to prevent over-running of the mechanism operated by the motor 11.)

Should manual operation of the positioning mechanism or any other influence, such as displacement of the contact arm 31 during such time as automatic control is inoperative, bring about a condition of unbalance in the bridge network of which the voltage-dividing resistors 21 and 30 form components, such unbalance will be detected by the detector-amplifier 37, one or other of the contactos 23—24 correspondingly energized and its contacts closed. At the same time, so long as the switch-arm 51 is out of engagement with the contact 53, current cannot flow through the motor circuit by way of said contact 53, or by way of the open contacts of the relay 62, which remains de-energized. However, while connection between conductors 27 and 55 is interrupted by said open contacts, as well as by the switch 50, a current path is provided from conductor 55 through the winding of relay 61 to conductor 27, and thence through the contacts of the closed contactor and through the corresponding field winding and the armature 14 of the motor 11 to the conductor 56. The impedance of the relay winding being high with respect to that of the motor, such current as may flow through this path will be of insufficient magnitude to operate the motor, while, on the other hand, the motor windings will offer negligible impedance to current flowing through the winding of the relay 61, and the latter will be energized and its contacts opened. This condition will occur at any time an unbalance develops while the motor is under manual control, and if the unbalance condition disappears the relay 61 will be de-energized and its contacts closed.

If the system be restored to automatic, or follow-up, control by placing the switch-arm 51 on the middle contact 53 of the switch 50, and the bridge network be in a balanced condition, normal operation will be established as hereinbefore described. If, on the other hand, restoration of the switch 50 to its "automatic" position finds a condition of unbalance to exist, the contacts of relay 61 will be open; and these, being in series with the winding of relay 62, will make energization of the latter impossible, so that direct connection cannot be established between conductors 66 and 27, and consequently the motor 11 will remain inoperative.

Re-establishment of operative conditions requires restoration of connection between conductors 27 and 66. This can be effected only by energization of relay 62, which in turn requires that the contacts of relay 61 be closed. In order to obtain this result, it is necessary that the series connection of the winding of the latter relay and the motor 11 across the line be interrupted, which demands that both contactors 23 and 24 be at least momentarily released, a result which can be obtained only by re-establishing a balanced condition in the bridge network. Upon such a balance being effected—usually by moving the arm 31 to a suitable position—relay 61 will be de-energized, relay 62 energized, and normal operating conditions restored.

The resistor 65 in series with the actuating winding of relay 62 is provided for the sole purpose of so delaying the operation of said relay that in the event of temporary loss of power, or the system being de-energized for any other reason, subsequent simultaneous re-energization of both relay windings upon the restoration of power cannot result in closing of the contacts of relay 62 prior to the opening of relay 61. Such coaction might defeat the purpose of the invention. It will be apparent to those versed in the art of automatic control that alternative means may be utilized for assuring the desired sequence of relay operation, without departing from the spirit of the invention. Furthermore, as previously pointed out, while the system has been shown in its application to the control of a motor of the divided-field class, it will be appreciated that the principles may be applied in conjunction with any type of motor whose electrical impedance is (as it usually will be) of a substantially lower order of magnitude than that of the actuating windings of such relays as may be used in its control.

The coaction of relays 61 and 62 with other components of the control system as thus far described will protect the same against undesirable performance upon the restoration of voltage after an interruption to the power supply 57, but is ineffective to provide such protection in the event of interruption and subsequent restoration of power supply to the bridge network comprising the resistors 21 and 30 and associated interconnections. In the event of such an interruption, however, the relay 63, normally energized from the source 34, will be released, and its contacts in series with the actuating winding of relay 62 immediately opened, de-energizing the latter relay and in turn causing its contacts to be opened, under which condition, as previously explained, it is impossible for the motor 11 to be operated under automatic control.

Upon restoration of voltage at the source 34, and concomitant re-energization of the bridge network, the winding of the relay 63 will be energized; but, because of the time delay introduced in the contact-closing operation of said relay by the device 64, the contacts will not immediately be re-closed. Adjustment of this delay is made such that the detector-amplifier 37 will have time to respond to the condition of the bridge network before the circuit through the winding of the relay 62 can be completed. If the bridge network is unbalanced, one or other of the contactors 23—24 will be actuated as hereinbefore described, whereby to maintain the relay 61 in an energized condition, and thus to inhibit automatic action of the apparatus until balance is restored and both said contactors simultaneously de-energized.

Figure 2:
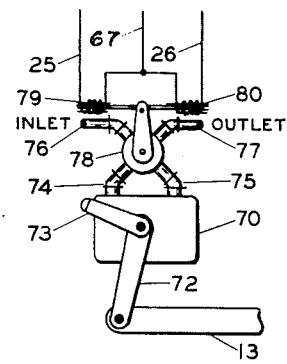
Fig. 2 is a diagram showing a fluid-operated motor which may be substituted for the electric motor shown in Fig. 1.

In Fig. 2 is shown a positioning mechanism 70 having an output shaft adapted for limited angular displacement and carrying a lever arm 72 and a contact arm 73 corresponding to the arms 12 and 20 shown in Fig. 1, and adapted for operation by means of an included fluid-actuated motor element—either pneumatic or hydraulic—in a direction depending upon which of two conduits 74 and 75 is made the admission and which the exhaust for a suitable pressure fluid. Interchangeably connecting the conduits 74 and 75 to an inlet conduit 76 and an outlet conduit 77 is a spring-centered solenoid-actuated four-way valve 78 provided with operating solenoids 79 and 80, whose respective energization from a suitable electric supply source will position the valve 78 to operate the motor 70 in a corresponding sense. One terminal of each of the solenoids 79 and 80 is connected to the common conductor 67, and the free terminals thereof to the conductors 25 and 26. In order to obtain the performance set forth in the description of the electrically operated positioning mechanism, the solenoids 79 and 80 are constructed to have impedance values substantially lower than that of the actuating winding of the relay 61 shown in Fig. 1.

Operation of the apparatus shown in Fig. 2 corresponds in all particulars to that shown in Fig. 1, the solenoids 79 and 80 being considered equivalent of the respective field windings 15 and 16 (each in series with the armature 14), of the electric motor 11. Upon energization of either of the solenoids 79—80 through conductor 25 or 26 and conductor 67, the valve 78 will be actuated in one direction or the other, depending upon which of said solenoids is rendered active, and the piping connections to the fluid motor in the operator 70 will be so set up as to effect operation in a corresponding sense. The impedances of the solenoids 79 and 80 being, like the windings of motor 11 in Fig. 1, of substantially lower value than that of the windings of the interlocking relays, the performance under conditions of initiating automatic operation when the balanceable network is in an unbalanced state will be identical to that set forth in the embodiment of the invention shown in Fig. 1, with resultant interlocking performance as hereinbefore described.

While as an alternative to the electric motor of Fig. 1 there has been described only the reversible fluid-actuated motor of Fig. 2, it will be understood that the invention is not so limited, and that its principle may be applied with equal facility to electrically operated reversing clutches, magnetically braked differential gears, solenoid actuated ratchets and escapements, or any form of motorized positioning system in which may be incorporated an electrically actuated operating device having an internal impedance low in comparison with that of a relay through which it may be controlled.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:
1. In a manual/automatic control system of the class having in combination a balanceable electrical network, an unbalance detector, motor means for balancing said network and having a predetermined impedance, electric circuit means for rendering said motor means responsive to conditions of unbalance in said network to restore a condition of balance therein, and manually actuable switch means whereby said motor means may be rendered un-responsive to network conditions and be energized at will for selected operation, said circuit including relay means of substantially greater impedance than that of said motor means, means responsive to conditions in said network for connecting said circuit in series with said motor means to render said relay means operative and said motor means inoperative, and contact means incorporated in said relay means for inhibiting subsequent operation of said motor under automatic control until a balance in said network is at least momentarily obtained.

2. A manual/automatic control system having in combination a balanceable electrical network, an unbalance detector, motor means for balancing said network, means controlled by said detector means for controlling said motor means to restore balance to said network upon unbalance thereof, a manually actuable switch means comprising a plurality of contacts and a switch member movable to a plurality of positions for engagement with the respective contacts, electric circuit means for rendering said motor control means effective to control said motor means when said switch member is engaged with one of said contacts, and for rendering said control means ineffective and energizing said motor means directly from said switch member upon movement of the latter from said one of said contacts and into engagement with another of said contacts, said electric circuit means comprising relay means for maintaining a connection between said one contact and said control means when said switch member is engaged with said one contact, and means responsive to unbalance of said network when said switch member is engaged with said other contact for operating said relay means to disestablish said connection and render said control ineffective to control said motor means until balance is restored to said network.

3. A manual/automatic control system having in combination a balanceable electrical network, an unbalance detector, motor means for balancing said network, means controlled by said detector means for controlling said motor means to restore balance to said network upon unbalance thereof, a manually actuable switch means comprising a plurality of contacts and a switch member movable to a plurality of positions for engagement with the respective contacts, electric circuit means for rendering said motor control means effective to control said motor means when said switch member is engaged with one of said contacts, and for rendering said control means ineffective and energizing said motor means directly from said switch member upon movement of the latter from said one of said contacts and into engagement with another of said contacts, said electric circuit means comprising relay means for maintaining a connection between said one contact and said control means when said switch member is engaged with said one contact, means responsive to unbalance of said network when said switch member is engaged with said other contact for operating said relay means to disestablish said connection and render said control means ineffective to control said motor means until balance is restored to said network, and other means responsive to deenergization of said network for controlling said relay means to disestablish said connection.

4. A manual/automatic control system having in combination a balanceable electrical network, an unbalance detector, motor means for balancing said network, means controlled by said detector means for controlling said motor means to restore balance to said network upon unbalance thereof, a manually actuable switch means comprising a plurality of contacts and a switch member movable to a plurality of positions for engagement with the respective contacts, electric circuit means for rendering said motor control means effective to control said motor means when said switch member is engaged with one of said contacts, and for rendering said control means ineffective and energizing said motor means directly from said switch member upon movement of the latter from said one of said contacts and into engagement with another of said contacts, said electric circuit means comprising relay means for maintaining a connection between said one contact and said control means when said switch member is engaged with said one contact, and means responsive to failure of power supply to said network, and to unbalance of said network when said switch member is engaged with said other contact, for operating said relay means to disestablish said connection and render said control means ineffective to control said motor means notwithstanding engagement of said switch member with said one contact.

5. A manual/automatic control system having in combination a balanceable electrical network, an unbalance detector, motor means for balancing said network, means controlled by said detector means for controlling said motor means to restore balance to said network upon unbalance thereof, a manually actuable switch means comprising a plurality of contacts and a switch member movable to a plurality of positions for engagement with the respective contacts, electric circuit means for rendering said motor control means effective to control said motor when said switch member is engaged with one of said contacts, and for rendering said control means ineffective and energizing said motor directly from said switch member upon movement of the latter from said one of said contacts and into engagement with another of said contacts, said electric circuit means comprising relay means for maintaining a connection between said one contact and said control means when said switch member is engaged with said one contact, and another relay means having contacts controlling the energization of the first-mentioned relay means, said other relay means having a winding connected with said control means to operate said contacts upon unbalance of said network when said switch member is engaged with said other contact for actuating the first-mentioned relay means and thereby render said control means ineffective to control said motor means until reestablishment of balance of said network.

6. A manual/automatic control system as defined by claim 5, including connections controlled by operation of said control means in response to unbalance of said network for connecting the winding of said other relay means in series with a portion of said motor means, the impedance of said winding being substantially greater than that of said motor means portion.

7. A manual/automatic control system as defined by claim 5, including connections whereby operation of the first-mentioned relay means to establish a connection between said one switch contact and the motor control means renders ineffective said other relay means as long as said one switch contact is engaged by said switch member.

8. A manual/automatic control system having in combination a balanceable electrical network, an unbalance detector, motor means for balancing said network, means controlled by said detector means for controlling said motor means to restore balance to said network upon unbalance thereof, a manually actuable switch means comprising a plurality of contacts and a switch member movable to a plurality of positions for engagement with the respective contacts, electric circuit means for rendering said motor control means effective to control said motor when said switch member is engaged with one of said contacts, and for rendering said control means ineffective and energizing said motor directly from said switch member upon movement of the latter from said one of said contacts and into engagement with another of said contacts, said electric circuit means comprising relay means for maintaining a connection between said one contact and said control means when said switch member is engaged with said one contact, and another relay means having contacts controlling the energization of the first-mentioned relay means, said other relay means having a winding energized by the power supply to said network whereby, upon failure of said power supply, said winding of said other relay means is deenergized and its contacts are operated for actuating the first-mentioned relay means to disestablish said connection to said control means.

9. A manual/automatic control system having in combination a balanceable electrical network, an unbalance detector, motor means for balancing said network, means controlled by said detector means for controlling said motor means to restore balance to said network upon unbalance thereof, a manually actuable switch means comprising a plurality of contacts and a switch member movable to a plurality of positions for engagement with the respective contacts, electric circuit means for rendering said motor control means effective to control said motor when said switch member is engaged with one of said contacts, and for rendering said control means ineffective and energizing said motor directly from said switch member upon movement of the latter from said one of said contacts and into engagement with another of said contacts, said electric circuit means comprising relay means for maintaining a connection between said one contact and said control means when said switch member is engaged with said one contact, a second relay means having contacts controlling the energization of the first-mentioned relay means, said second relay means having a winding connected with said control means to operate said contacts upon unbalance of said network when said switch member is engaged with said other contact for actuating the first-mentioned relay means and thereby render said control means ineffective to control said motor until reestablishment of balance of said network, and a third relay means, having contacts controlling the energization of the first-mentioned relay means, said third relay means further having a winding energized by the power supply to said network, whereby upon failure of said power supply said winding of said third relay means is deenergized and its contacts are operated for actuating the first-mentioned relay means to disestablish said connection to said control means.

10. A manual/automatic control system as defined by claim 5, including means for delaying operation of the first-mentioned relay means upon energization thereof simultaneously with said other relay means following previous deenergization of the system, to prevent closing of the contacts of said first-mentioned relay means prior to opening of the contacts of said other relay means.

11. A manual/automatic control system as defined by claim 8, including means for delaying operation of said other relay means to close its contacts upon energization of the winding of said other relay means simultaneously with said network following previous loss of power supply thereto, thereby providing time for response of said detector to the condition of said network before said contacts are closed.

12. A manual/automatic control system having in combination a balanceable electrical network, an unbalance detector, motor means for balancing said network, means controlled by said detector means for controlling said motor means to restore balance to said network upon unbalance thereof, a manually actuable switch means comprising a plurality of contacts and a switch member movable to a plurality of positions for engagement with the respective contacts, electric circuit means for rendering said motor control means effective to control said motor when said switch member is engaged with one of said contacts, and for rendering said control means ineffective and energizing said motor directly from said switch member upon movement of the latter from said one of said contacts and into engagement with another of said contacts, said electric circuit means including means for maintaining a connection between said one contact and said control means when said switch member is engaged with said one contact, and means responsive to unbalance of said network when said switch member is engaged with said other contact for rendering said connection-maintaining means ineffective.

13. A manual/automatic control system having in combination a balanceable electrical network, an unbalance detector, motor means for balancing said network, means controlled by said detector means for controlling said motor means to restore balance to said network upon unbalance thereof, a manually actuable switch means comprising a plurality of contacts and a switch member movable to a plurality of positions for engagement with the respective contacts, electric circuit means for rendering said motor control means effective to control said motor when said switch member is engaged with one of said contacts, and for rendering said control means ineffective and energizing said motor directly from said switch member upon movement of the latter from said one of said contacts and into engagement with another of said contacts, said electric circuit means including means for maintaining a connection between said one contact and said control means when said switch member is engaged with said one contact, means responsive to unbalance of said network when said switch member is engaged with said other contact for rendering said connection-maintaining means ineffective, and means responsive to failure of power in said network irrespective of the position of said switch member for rendering said connection-maintaining means ineffective.

References Cited in the file of this patent

UNITED STATES PATENTS

| | | |
|---|---|---|
| 2,466,702 | Hamby | Apr. 12, 1949 |
| 2,498,223 | Rommel | Feb. 21, 1950 |
| 2,504,139 | Malen | Apr. 18, 1950 |
| 2,641,213 | Bolin | June 9, 1953 |
| 2,644,642 | Smoot | July 7, 1953 |